United States Patent [19]
Oldershaw et al.

[11] Patent Number: 4,933,784
[45] Date of Patent: Jun. 12, 1990

[54] AUTOMATIC HEAD POSITION TRACKING SYSTEM FOR VIDEO SIGNALS RECORDED IN A SEGMENTED FORMAT

[75] Inventors: Reginald W. Oldershaw, Redwood City; Robert B. Steele, Menlo Park, both of Calif.

[73] Assignee: Ampex Corporation, Redwood City, Calif.

[21] Appl. No.: 265,189

[22] Filed: Oct. 31, 1988

[51] Int. Cl.⁵ .................... H04N 5/783; G11B 5/596
[52] U.S. Cl. .............................. 360/77.16; 360/78.02; 360/10.3; 360/11.1
[58] Field of Search ............... 360/10.1, 10.2, 10.3, 360/11.1, 77.16, 77.17, 78.02, 35.1, DIG. 1

[56] References Cited

U.S. PATENT DOCUMENTS

| | | | |
|---|---|---|---|
| 4,151,570 | 4/1979 | Ravizza et al. | 360/77.17 |
| 4,172,265 | 10/1979 | Sakamoto et al. | 360/77.16 |
| 4,233,637 | 11/1980 | Kubota | 360/DIG. 1 |
| 4,236,185 | 11/1980 | Obremski | 360/10.2 |
| 4,251,838 | 2/1981 | Saito | 360/DIG. 1 |
| 4,255,768 | 3/1981 | Kubota | 360/10.2 |
| 4,287,538 | 9/1981 | Sakamoto et al. | 360/10.2 |
| 4,366,515 | 12/1982 | Takano et al. | 360/77.16 |
| 4,389,686 | 6/1983 | Isaka et al. | 360/10.2 |
| 4,462,049 | 7/1984 | Heitmann | 360/10.2 |
| 4,482,928 | 11/1984 | Moriya et al. | 360/77.16 |
| 4,484,236 | 11/1984 | Wilkinson | 360/19.1 |
| 4,558,376 | 12/1985 | Heitmann | 360/10.3 |
| 4,659,972 | 4/1987 | Uchikoshi et al. | 318/616 |
| 4,663,555 | 5/1987 | Yoshihiro | 310/317 |

FOREIGN PATENT DOCUMENTS 037738 10/1981 European Pat. Off.
49-9919 1/1974 Japan.

OTHER PUBLICATIONS

Recent Progress in Betacam System Technology, by Tsuneo Morita.
New Technique of Special Noiseless Reproduction in Matsushita NV-1000, by Masayuki Matsumoto et al.
Design Considerations for the D-2 NTSC Composite DVTR, by Richard Brush.

Primary Examiner—Vincent P. Canney
Assistant Examiner—David L. Robertson
Attorney, Agent, or Firm—Elizabeth E. Strnad; Douglas M. Gilbert

[57] ABSTRACT

Plural magnetic transducing heads are employed to record and reproduce video information that is stored in a segmented format. One head is in contact with the magnetic recording tape while the other head is out of contact with it. The position of the head which is in contact with the tape is controlled by a suitable ramp voltage generated in accordance with the ratio of actual tape speed to normal play speed, to maintain the head generally aligned with a track on the tape. The other head, which is out of contact with the tape, is also positioned in the same fashion. When a repositioning of the heads is required, a determination is made whether the track of information being reproduced by the head in contact with the tape relates to a particular segment of a field, for example the last field. If so, the head which is out of contact with the tape is appropriately repositioned so that it is in the proper location when it comes into contact with the tape to begin scanning the first segment associated with the next field that is being reproduced. Once the other head has come out of contact with the tape at the end of the previous field, it is repositioned to bring it to the location of the head which is now in contact with the tape.

9 Claims, 4 Drawing Sheets

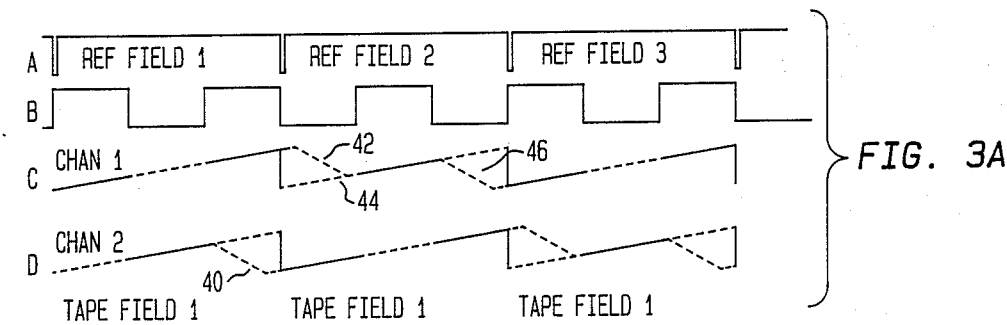
FIG. 3A
FIG. 3B
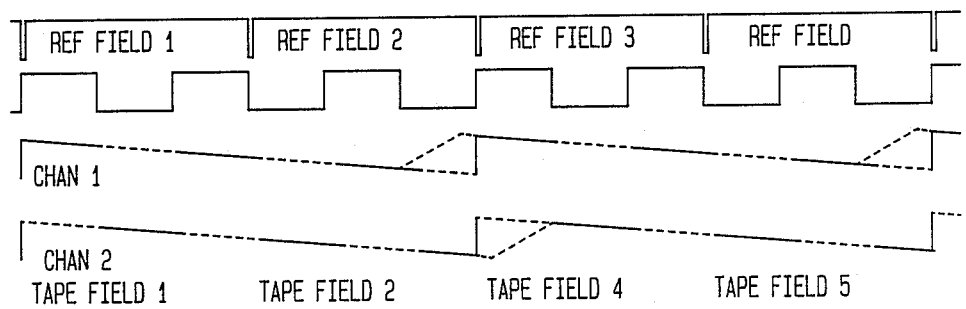
FIG. 4B
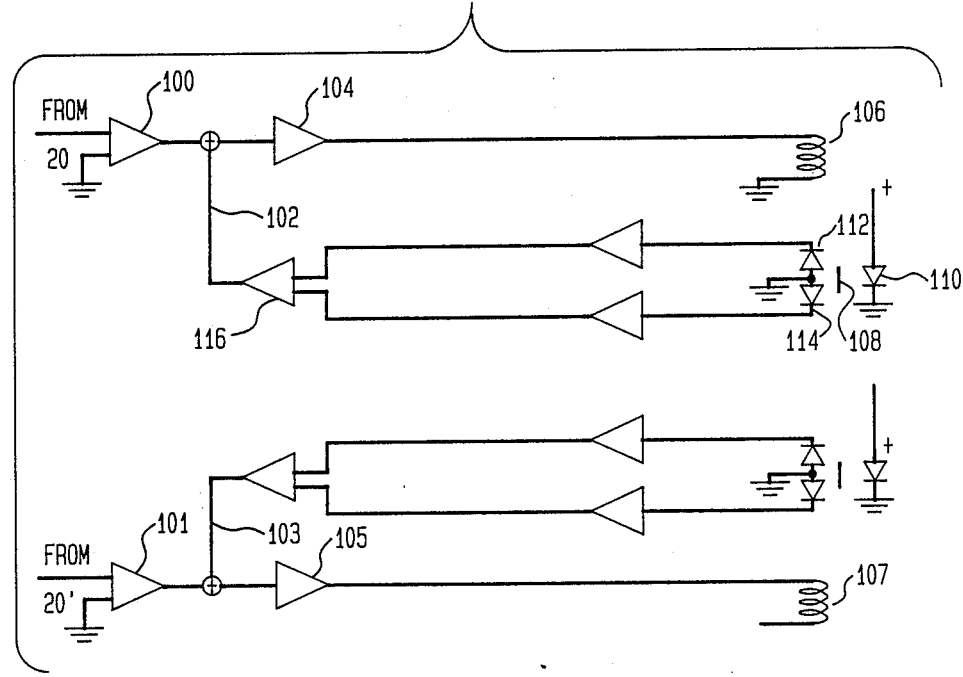

AUTOMATIC HEAD POSITION TRACKING SYSTEM FOR VIDEO SIGNALS RECORDED IN A SEGMENTED FORMAT

BACKGROUND OF THE INVENTION

The present invention is generally directed to the recording and reproduction of signals on a magnetic medium, particularly the positioning of a record/reproduce transducer head adjacent to a track of information on a magnetic recording tape. More specifically, the invention is directed to a system for automatically positioning plural transducing heads adjacent to tracks of video signal information that is recorded in a segmented format.

Information signals, for example video signals, are typically recorded on a magnetic medium, such as magnetic tape, in discrete tracks of information. In one type of recording system that is in widespread use for recording video signals, the magnetic tape is disposed around the periphery of a scanning drum and longitudinally transported relative thereto. One or more magnetic transducing heads rotate about the circumference of the drum. The tape follows a helical path around the drum, so that the rotating head transcribes a path, or track, along the tape that is disposed at an angle relative to the longitudinal direction of the tape. As the tape is transported around the drum at a predetermined speed, successive adjacent tracks are formed on the tape at that angle. During playback, if the tape is transported around the scanning drum at the same speed, the rotating transducing head will successively read the tracks in the order in which they were recorded.

To provide special effects, such as slow motion, stop frame, reverse motion, etc., the tape is transported past the scanning head at a speed different from the normal record and play speed. Due to the change in relative speed between the tape and the rotating head, the path circumscribed by the head does not precisely follow the track recorded on the tape. More precisely, the angle at which the head traverses the tape will be different from the angle of the recorded track. The magnitude of this angular difference will be dependent upon the deviation of the tape speed from the normal record and playback speed.

Accordingly, in order to faithfully reproduce individual tracks of video information, it is necessary to deflect the transducing head in a direction that is substantially transverse to its path of movement around the scanning drum. In other words, the transducing head must be moved in a direction that is parallel to the axis of the drum to enable it to remain adjacent to a particular track of recorded information. The position of the head in this direction is sometimes referred to as its "elevation." Exemplary servo systems for controlling the elevation of the transducing head are disclosed in U.S. Pat. Nos. 4,151,570, 4,163,993 and 4,485,414, among others.

Generally speaking, head elevation servo systems have two basic modes of operation. One mode, which might be viewed as a "coarse" control mode, involves the general positioning of the head at a location where the recorded track is expected to be. More particularly, the longitudinal speed of the tape, relative to normal play speed, provides an indication of the deviation between the angle of a track recorded on the tape and the normal path followed by the transducing head. Thus, based upon the ratio of actual tape speed to normal play speed, or other factors related to this ratio, the location of the track at any point in the rotational movement of the transducing head can be predicted, and the head positioned at this predicted location. Typically, the elevation of the head is controlled by means of a voltage signal. In operation, a ramp voltage can be generated whose slope is proportional to the ratio of actual tape speed to normal tape speed and whose direction is dependent upon whether the actual tape speed is slower or faster than normal play speed. By applying this ramp voltage to the head position servo system, the head can be positioned at the predicted location for the track. Thus, if the tape is being transported at normal play speed, the ramp would have a slope of zero, so that the transducing head is at a center elevation where it traverses its normal path around the scanning drum.

Within this coarse control mode of operation, a fine positioning of the transducing head is also carried out. More particularly, due to varied conditions such as stretching of the tape, differences in the normal speed between one machine and another, etc., the transducing head may not be precisely positioned over a recorded track. As the location of the head moves away from the center of the track, the quality of the reproduced signal begins to degrade. Thus, various techniques have been developed to maintain the transducing head substantially centered over the recorded track. One popular technique imposes a continuously oscillating dither signal on the ramp voltage to provide feedback information that enables the transducing head to be precisely positioned. Further disclosure regarding the use of the dither signal is provided, for example, in the aforementioned U.S. Pat. No. 4,151,570.

The present invention is particularly concerned with the first mentioned mode of operation of a head position servo system, i.e. the general control of head elevation based upon a predicted location of the recorded track. Therefore, further discussions will be focussed upon this aspect of the servo system.

As noted above, the general positioning of the head is carried out by generating a ramp voltage whose slope is related to the ratio of actual tape speed to normal play speed. In addition, the voltage must be periodically reset between tracks to assure proper positioning. For example, in the stop, or freeze frame mode, the same field or frame of video information must be continuously reproduced. In one class of recording, each field is recorded on a single track. Therefore, the same track must be continuously reproduced to display a single field, or two adjacent tracks must be alternately reproduced to display a complete frame, for a normal television signal which comprises a sequence of frames, each consisting of an odd field and an even field, according to the television standard RS170A. During each reproduction of a track, i.e., display of a field, the transducing head is displaced by the head position servo system due to the fact that the tape is not being transported at its normal play speed. Therefore, at the end of each track the head must be repositioned for the beginning of the next track. This repositioning is carried out by resetting the ramp voltage to the same value at the beginning of each track.

A similar type of operation is carried out in other viewing modes. For example, if the tape is being played at 2/3 normal speed, every other field is repeated once. Thus, the head would be positioned to reproduce two fields in succession, and then reset to reproduce the second field. Similarly, if the tape is being played at twice the normal speed, every other field must be skipped. Therefore, after each track is reproduced, the head must be reset to jump the next adjacent track and begin reproduction of the following track.

In the past, video signals have typically been recorded on the tape in an analog format. In this format, each field is recorded on one track of information, which is reproduced during one revolution of the scanning drum. At the end of each revolution, the appropriate action can be carried out to properly position the head prior to the scanning of the next track of information.

More recently, however, video signals have begun to be recorded on tape in a digital format. In the format known as the D-2 format, there is not a one-to-one correspondence between a track of information and a video field. Rather, the digital information pertaining to one video field is typically divided into three or four segments, and each segment is recorded on a separate track. Thus, the display of a single video frame or field involves the reproduction of plural tracks on the tape. In this type of operation, it is not possible to reset the position of the head between any two tracks. Rather, the resetting of the head must be coordinated with the segmentation of the field to ensure proper display of the field. For example, if a field of video information is divided into three segments, the head should not be reset between the segments pertaining to a single field. If it were, the top segment of the video display may relate to one field whereas the bottom segment could pertain to a different field, resulting in a distorted picture. Thus, the resetting of the head must be coordinated with the segmentation of the field.

A further consideration that requires attention in digital recording is the fact that the segmented video information is recorded and reproduced with more than one head. For example, the scanning drum may have two heads which are located 180° apart from one another. Typically, the magnetic tape is only in contact with one half of the scanning drum in this type of arrangement. Thus, one head will be in contact with the tape while the other head is not. As one head concludes the recording or reproduction of a track and begins to come out of contact with the tape, the other head comes into contact with the tape and begins the recording or reproduction of the next successive track.

This type of arrangement presents additional difficulties with regard to the proper positioning of the heads. More particularly, when a head is in contact with the tape, the quality of the video signal that is reproduced can be used as an indicator of the location of the head relative to the track. However, when the head is out of contact with the tape, this type of feedback is not available.

In the past, this difficulty was addressed by returning the head to a predetermined reference position each time it came out of contact with the tape. The head remained in this reference position during the time that it was out of contact, and then it was quickly shifted to an appropriate position to begin scanning the next track when it was brought back into contact with the tape. It can be appreciated that this type of operation requires two resets for each track that is to be scanned, i.e., one reset at the end of the track to bring the head to the reference position and a second reset at the beginning of the next track to bring the head from the reference position to the appropriate position for initial scanning of that track.

The systems that are in present use to position the transducer head are mechanical in nature. Typically, they might include a piezoelectric element whose physical shape is changed in response to an electrical control signal, or a voice coil which is deflected by the control signal. Being mechanical in nature, they have inherent inertia which limits the speed at which the head can be repositioned from one location to another. In addition, they may become subject to wear and/or drift after repeated use. A system which requires frequent and rapid resetting of the head position, such as that referred to above, is limited by the physical constraints of mechanical head positioning systems.

Accordingly, it is desirable to provide a head position servo system which is suitable for use with digital video signals that are recorded in a segmented format. Further along these lines, it is desirable to carry out accurate elevational positioning of a magnetic transducing head in a head position servo system with a minimum number of resets being required for any particular playback mode, to thereby reduce the wear on the head positioning system.

BRIEF STATEMENT OF THE INVENTION

In accordance with the present invention, plural magnetic transducing heads are employed to record and reproduce video information that is stored in a segmented format. For example, each field of the video signal can be divided into three segments, and two heads can alternately record and/or reproduce the segments. In operation, one head is in contact with the magnetic recording tape while the other head is out of contact with it. However, the positioning of both heads is carried out in a dependent fashion. The position of the head which is in contact with the tape is controlled by suitable ramp voltage generated in accordance with the ratio of actual tape speed to normal play speed, to maintain the head generally aligned with a track on the tape. The other head, which is out of contact with the tape, is also positioned in the same fashion. Thus, when this head comes into contact with the tape, it will be at the proper position to begin the recording or reproduction of the next track on the tape.

When a repositioning of the heads is required, for example, to jump tracks in a non-standard play mode, a determination is made whether the track of information being reproduced by the head in contact with the tape relates to the last segment of a field. If so, the head which is out of contact with the tape is appropriately repositioned so that it is in the proper location when it comes into contact with the tape to begin scanning the first segment associated with the next field that is being reproduced. Then, once the other head has come out of contact with the tape at the end of the previous field, it is repositioned to bring it to the location of the head which is now in contact with the tape.

By controlling the position of the head which is off-tape in accordance with the position of the on-tape head, the need for unnecessary resets at the beginning and end of each track scan is eliminated. Furthermore, since each head is out of contact with the tape for approximately one half its period of revolution, the repositioning of the heads can be readily carried out over this period of time. Thus, the inherent inertia presented by head positioning systems can be easily accommodated without undue stress.

Further features of the invention and the advantages offered thereby are explained in greater detail with reference to preferred embodiments illustrated in the accompanying drawings.

BRIEF DESCRIPTION OF THE DRAWINGS

FIGS. 3A and 3B are timing diagrams illustrating the relationship of the transducing heads to the segments of the video signal during non-standard play modes;

FIGS. 4A and 4B are continuous portions of a block diagram illustrating a circuit for controlling the elevation of the transducing heads in accordance with the present invention.

DESCRIPTION OF THE ILLUSTRATED EMBODIMENTS

To facilitate an understanding of the present invention, it is described in the context of the reproduction of a video signal that is divided into three segments. It has been found that the division of the signal into three segments is particularly well suited for NTSC television signals. It will be appreciated by those of ordinary skill in the art, however, that the invention is applicable to other types of recording formats. For example, it can be used with equal success in the recording and reproduction of PAL signals which are more likely to be divided into four segments per field.

Furthermore, the exemplary embodiment of the invention illustrates the use of head pairs in each channel to record two tracks of information at a time. In a preferred embodiment of the invention, the heads are angled relative to one another to provide a cross-azimuth recording format, and thereby avoid the need for guard bands between adjacent tracks. Again, it will be appreciated that the invention is applicable to other arrangements of the heads for recording and reproducing video signals.

Figure 1A:
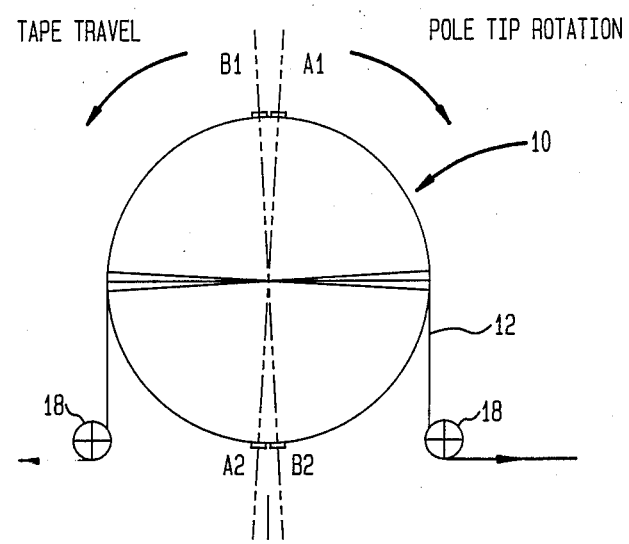
FIGS. 1A and 1B are schematic illustrations of a scanning drum and the tape transport path in a system for recording and/or reproducing video signals in a segmented format.
Figure 1B:
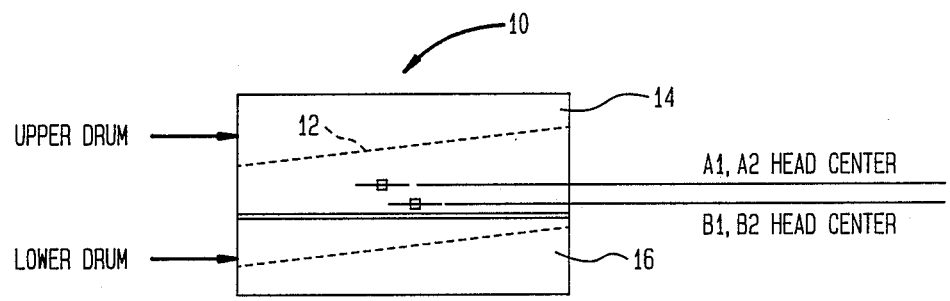

Referring to FIGS. 1A and 1B, top and side views are respectively illustrated for a scanning head arrangement of the type to which the present invention is applicable. The recording or reproducing system includes a scanning drum 10 about which the magnetic recording tape 12 is partially wrapped. As best shown in FIG. 1B, the drum 10 includes an upper drum 14 and a lower drum 16. The lower drum 16 remains stationary while the upper drum 14 is rotated. In the embodiment illustrated in FIG. 1A, the rotation of the drum is in a clockwise direction. The tape 12 is guided around a pair of guide rollers 18 and the drum 10 so that it is in contact with approximately 180° of the surface of the drum. The tape is longitudinally moved by a suitable transport mechanism, for example, a capstan (not shown), so that it traverses the surface of the drum. In the embodiment illustrated in FIG. 1, the direction of tape movement across the surface of the drum is counterclockwise, i.e., opposite to the direction of drum movement.

Two pairs of magnetic transducing heads A1, B1, A2, B2 are disposed at the circumferential surface of the upper rotating drum 14. One pair of heads A1, B1 is disposed 180° from the other pair A2, B2. Thus, as illustrated in FIG. 1A, one pair of heads (A1, B1) is in contact with the portion of the tape 12 disposed around the periphery of the drum 10, while the other pair A2, B2 is out of contact with the tape. As the drum rotates, the pairs alternately come in contact with the tape. As illustrated in FIG. 1B, the tape 12 is disposed along a path that forms a helix around the surface of the drum 10. Thus, as the upper drum 14 rotates, the individual heads transcribe tracks which are oriented at an acute angle relative to the longitudinal direction of the tape.

Assuming the axis of the drum 10 is vertically oriented, the heads normally travel about a horizontal path. To improve packing density on the tape, one head in each pair, e.g., A1, A2 is oriented at an angle of about 15° relative to the horizontal plane. The other head, B1, B2 in each pair is oriented at the same angle but in the opposite direction, to provide a cross azimuth relationship. With this arrangement, the tracks transcribed by the respective heads in each pair can be located directly adjacent one another, without interference between them during playback.

Figure 2A:
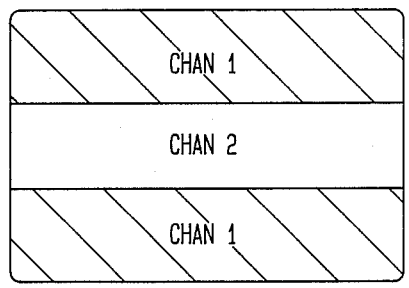
FIGS. 2A and 2B are illustrations of a segmented video field, illustrating the alternating relationship of the transducing heads to the segments.
Figure 2B:
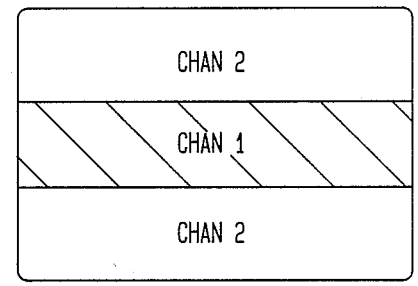

As noted previously, each field of the video signal is divided into three segments, and the respective pairs of transducers alternately record or reproduce each successive segment. The effect of such an arrangement is illustrated in FIGS. 2A and 2B. In these figures, and throughout the rest of the specification, one pair of heads, e.g., A1, B1, is referred to as channel 1, and the other pair is referred to as channel 2. Referring to FIG. 2A, it can be seen that the top segment of the first field is recorded or reproduced by the channel 1 heads, the middle segment is obtained with the channel 2 heads and the bottom segment is associated with the heads of channel 1. A complementary relationship exists with regard to the second field, in which channel 2 is associated with the top and bottom segments and channel 1 pertains only to the middle segment. For each field in the television signal, 1 ½ revolutions of the scanning drum 10 are required.

This relationship between the magnetic heads and the display of the television picture is further illustrated in the timing diagram of FIG. 3A. Signal A illustrated in FIG. 3A is the vertical synchronizing signal that is generated by a reference source or reproduced from the information on the tape. Basically, each pulse in the signal indicates the beginning of a new field of video information. Signal B in FIG. 3A relates to the operation of the scanning drum tachometer. This signal is a square wave signal which is at a logic high value for one-half of the revolution of the scanning drum 10 and at a logic low value for the second half of the revolution. Thus, FIG. 3A illustrates the need for 1 ½ revolutions of the scanning drum to reproduce each field of the video signal.

Signals C and D respectively relate to the channel 1 and channel 2 heads. In each of these signals, a solid line indicates the time during which the head is in contact with the tape, and a dashed line relates to the time that the head is out of contact with the tape. As can be seen, the on-tape and off-tape status of the heads corresponds to the respective high and low values of the scanning drum tachometer signal.

In addition, signals C and D shown in FIG. 3A illustrate the changing elevation of each of the heads during operation. The specific example illustrated in FIG. 3A relates to a still frame mode in which the tape is stopped. In this mode of operation, the heads are reset after each field is reproduced, to enable the same field to be continuously displayed. In FIG. 3A, the individual portions of the tape vertical synchronizing signal A are labelled "Field 1", "Field 2", "Field 3" to indicate the time sequence of the fields. In fact, however, during the freeze frame mode, they all pertain to the same field of the video signal, as shown by the labels below signal D.

In operation, the elevation of each head is varied as respectively shown by the sloped signals C and D, to maintain the heads at the proper position to scan the tracks of information. During the first segment of the first field, the heads for channel 1 are in contact with the tape and read the information therefrom. During this time, although the heads for channel 2 are not in contact with the tape, their elevation is varied commensurate with that of the channel 1 heads. Thus, at the time the channel 2 heads come into contact with the tape, they will be at the proper elevation to immediately begin reproducing the information from the tracks associated with the second segment of the field. During this time, the elevation of the channel 1 heads continues to be varied in the same manner as those of channel 2, so that these heads will be properly positioned when they are brought back into contact with the tape.

During the final segment of the first field, FIG. 3A illustrates that the heads for channel 1 are playing back the video information and the heads for channel 2 are off tape. At this time, the elevation of the channel 2 heads are examined to see if a track jump, i.e. an elevation reset, is required. In the example shown in FIG. 3A, such a reset is to be carried out. Accordingly, during this time the elevation of the channel 2 heads is reset so that they are in the proper position to reproduce the same field once they come into contact with the tape, i.e. during the first segment of the second field. Since the channel 2 heads are off tape for one-half of the revolution of the scanning drum, it can be appreciated that the elevation resetting operation can be carried out in a somewhat leisurely fashion, as indicated by the sloped line 40 for signal D. In other words, the repositioning of the heads does not have to be almost instantaneous, and thus the inherent inertia associated with the head positioning system can be readily accommodated.

Once the channel 2 heads come into contact with the tape and begin to reproduce the first segment of field 2, the heads for channel 1 are repositioned, as shown by the line 42. Once they are reset, their elevation is varied commensurate with that of the channel 2 heads, as indicated by the sloped line 44. Thus, once the channel 1 heads come into contact with the tape they are in the appropriate position to immediately begin reproducing the second segment of information for field 2. At the end of this segment, the channel 1 heads are again reset, as indicated by the line 46, in preparation to replay the same field when they once again come on tape. Thus, during the second field, the channel 1 heads are reset two times, with both resets occurring while the heads are off tape. During this same field, the channel 2 heads are not reset at all. Preferably, since neither of the heads are reset during the second segment of each frame, their respective positions are compared with one another at this time and the position of the off-tape head is matched to that of the on-tape head.

Another illustration of the relationship of the heads during a non-standard play mode is illustrated in FIG. 3B. This particular example relates to the situation in which the tape is played at 1 ½ times the normal play speed. In this mode, every third field of the video signal is skipped. During the time sequence of the first two fields, the heads of the two channels alternately reproduce the video signal in the normal fashion, and their elevational positions are coordinated with one another. Since the first and second recorded fields are played back in succession, no track jump (head reset) occurs between these two fields. However, since the third field is to be skipped, a track jump occurs after the second field in a direction opposite the direction of the jump shown in FIG. 3A, where a field is repeated. Thus, during the last segment of the second field, the channel 1 heads are off tape, and their elevation is reset by a distance equal to one track jump. When they go back on tape, they will begin reproducing the first segment of the fourth frame. At this time, the heads of the other channel are reset and then moved in accordance with channel 1 heads, so that they will be in the proper position to reproduce the second segment of the fourth field.

Figure 4A:
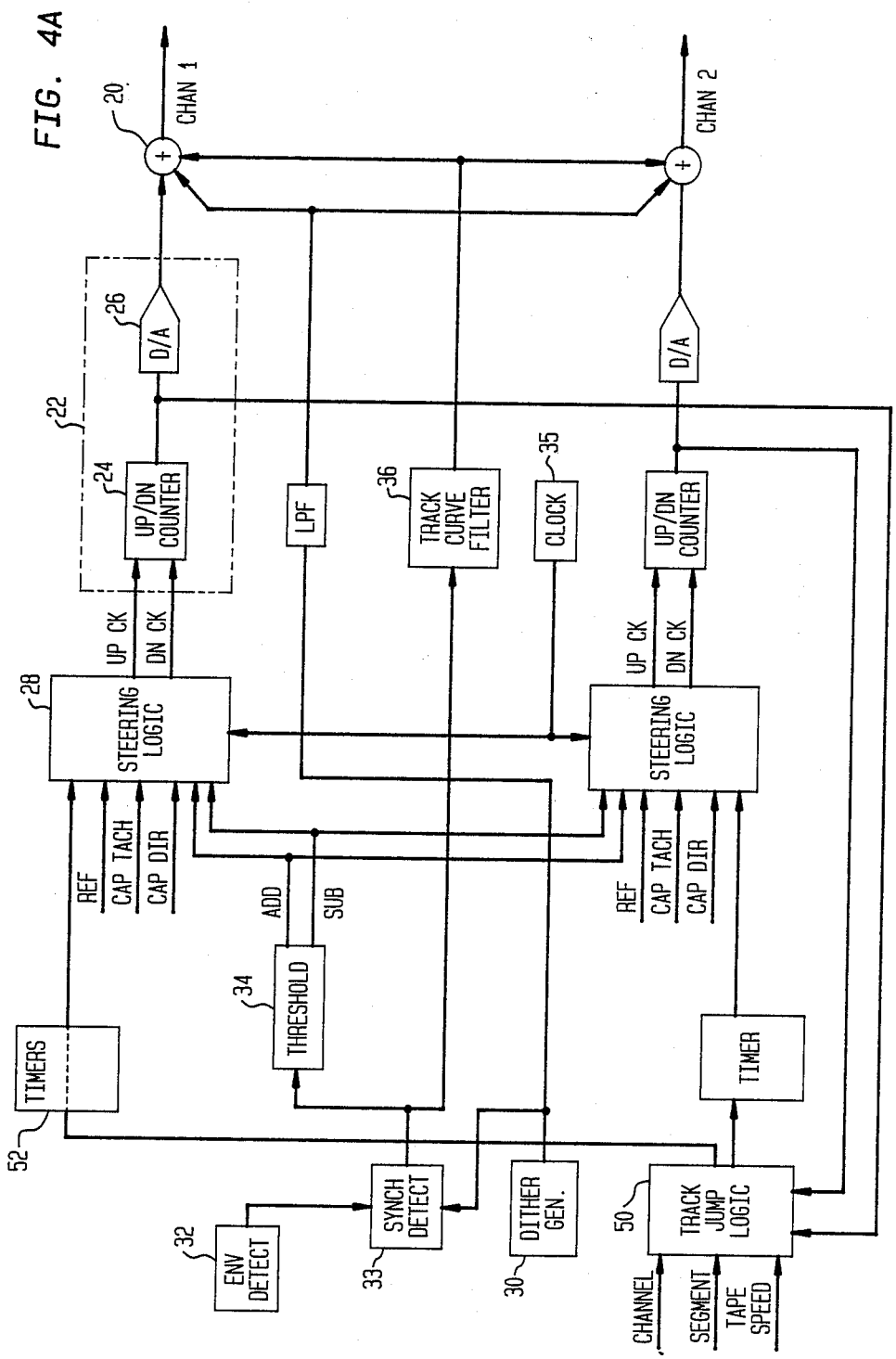

A head position servo system for controlling the elevation of the heads in accordance with the foregoing procedure is illustrated in block diagram form in FIGS. 4A and 4B. Referring to FIG. 4A, the elevation of the heads of each channel is controlled in accordance with a voltage signal produced at a respective summing junction 20, 20'. Referring to the portion of the circuit for controlling the channel 1 heads, the primary signal provided to the summing junction is a ramp voltage produced by a ramp generator 22. In the illustrated embodiment, the ramp generator comprises an up/down counter 24 whose contents are provided to a D/A converter 26. The ramp generator 22 primarily functions to provide a signal related to the ratio of actual tape speed to normal playback speed. To this end, a capstan tachometer signal, indicative of actual tape speed, is applied to one input terminal of a steering logic circuit 28. Another input terminal of the logic circuit receives a reference signal related to the normal play speed of the capstan tachometer. When the tape is moving in the forward direction, as indicated by a capstan direction signal, each pulse of the reference signal causes the up/down counter 24 to be incremented, and each pulse of the capstan tachometer causes it to be decremented. Thus, when the tape is moving at normal play speed, the number of pulses in the two signals will be equal and the contents of the up/down counter 24 will remain fixed, resulting in a ramp voltage having a zero slope.

Another input to the summing junction 20 comprises the output signal from a dither generator 30. The dither generator produces a low amplitude signal having a frequency approximately twenty times the vertical synchronizing frequency of the television signal. The result of this dither signal is to produce a slight oscillation of the heads about the position determined by the ramp voltage. In accordance with well known principles, this oscillation induces an envelope in the RF signal that is reproduced by the heads. This RF signal is fed to an envelope detector 32 to produce a signal indicative of the shape of the envelope.

Following the envelope detector, the signal passes through a synchronous detector 33 to detect the dither signal present on the envelope. The output signal from the synchronous detector is supplied to a threshold detector, or slicer circuit, 34 which determines an offset or centering error for the head. If an error is present, as indicated by a non-symmetry in the RF envelope, the threshold detector provides an add or subtract input signal to the steering logic in dependence upon the direction of the offset. These input signals cause a pulse from a clock 35 to be sent to the up or down input terminal of the counter 24, to thereby "bump" the ramp signal in the appropriate direction to center the head on the track. Typically, only one or two pulses of this type might be applied for each field of the video signal, to provide a slow rate correction.

The output signal from the envelope detector 32 is also applied to a track curvature filter 36. This filter integrates the output signal of the envelope detector over several tracks of the tape, to provide an output signal indicative of the general shape of a number of tracks. This signal is provided as a third input signal to the summing junction 20, and compensates for long-term effects such as stretching of the tape.

Referring to FIG. 4B the elevation control signals from the summing junctions 20 and 20' are applied to one input terminal of respective operational amplifiers 100,101. The output signal from each amplifier is summed with a position signal on a line 102,103 amplified in an amplifier 104,105, and applied to a voice coil 106,107. The voice coils 106,107 comprise respective actuators which operate in a magnetic field for controlling the elevational position of the magnetic transducing heads (not shown in FIG. 4B).

The actual position of each head is sensed and fed back as the position signal which appears on the lines 102,103. This position signal can be provided by means of an optical sensor. For example, referring to the channel 1 arrangement, the arm or other support upon which the magnetic heads are mounted can include a blade 108 or other suitable light blocking device, which is disposed between an LED 110 and a pair of photodiodes 112,114. When the head is in its normal elevational position, the blade 108 equally shades each of the photodiodes 112,114. The signal from each photodiode is provided to a differential amplifier 116. Since they are equally shaded, they will produce equal output signals, and thus the position signal provided on line 102 will be at a null value. When the heads are moved from their normal position, the blade 108 will allow more of the light from the LED 110 to shine on one photosensor than the other. Thus, the differential amplifier 116 will become unbalanced, and provide an appropriate position signal 102 to be summed with the output signal from the operational amplifier 100. This summing results in an error signal that is applied by the amplifier 104 to the voice coil 106. In other words, if the heads are at the desired position indicated by the signal from the summing junction 20, the position signal 102 will be equal to the output signal from the operational amplifier 100 but of opposite polarity, so they cancel one another, and a very small error signal will be applied to the voice coil 106.

The positioning system for the channel 2 heads operates in a similar fashion.

In addition to the tape velocity related signals and the tracking error signals based upon the RF envelope, the steering logic 28 (FIG. 4A) also receives track jump, or reset, signals for repositioning the head upon completion of the reproduction of a video field. More particularly, as the speed of the tape deviates from normal play speed, the output signal from the ramp generator 22 is a voltage signal having a positive or negative slope, depending upon whether the speed of the tape is greater than or less than normal play speed. The greater the deviation between normal and actual speeds, the greater the slope of the ramp voltage signal. As a result, the elevation of the head continues to be displaced farther from its normal play position, and it must be periodically reset at the completion of the scan of a video field to properly position it for the scanning of the next subsequent field, in accordance with well known principles.

For example, if the tape is stopped in a freeze action playback mode, the head must be repositioned a distance related to one field on the tape after each field is reproduced. For analog recording systems in which each track contains one complete video field, the head would be repositioned a distance related to the width of one track. In recording systems which use a segmented format, however, the head must be repositioned by a distance related to the width of a multiple number of tracks. This multiple is determined by the number of segments per field as well as the number of heads which simultaneously scan the tape during each segment. In the presently illustrated example, a one field displacement of the head would be related to the width of six successive tracks. Due to the fact that the relative speed of the head to the tape during non-normal playback modes is different from that in a regular playback mode, the precise amount of the jump is not exactly equal to six track widths, but is slightly less than or greater than this distance as determined by actual tape speed.

As is apparent from the timing diagrams of FIGS. 3A and 3B, the elevation resets must also be coordinated with the on-tape and off-tape status of the heads, and the particular segment of information, i.e. whether it pertains to the beginning or end of a field. This information, as well as the tape speed and the ramp signal, indicative of the elevation of the head, is fed to a track jump logic circuit 50. For example, the channel information could merely comprise the binary scanner tachometer signal, which indicates whether the scanning drum is in the first or second half of its revolution, and thus whether the channel 1 or channel 2 heads are on tape. The segment signal is obtained from the tape itself. More particularly, each track of information recorded on the tape can contain a preamble or otherwise be encoded to identify the particular segment of the field to which it relates. This enables the first and last segments to be readily identified. Alternatively, the particular segment that is being reproduced can be determined by the tape vertical synchronizing signal and the scanner tachometer signal, or by means of information on a control track also recorded on the tape.

In response to this input information, the track jump logic circuit 50 produces an output signal to the steering logic 28 to indicate when an elevational reset is to occur. In particular, this information indicates the magnitude of the reset and the direction in which it is to take place. The signal from the track jump logic circuit 50 is applied to the steering logic 28 through a set of timer chips 52. The track jump logic loads one of these chips with the number of ramp bits to jump, and the other chip is loaded with the rate at which the jump is to occur. In response to the data loaded in the timer chips, the steering logic feeds an appropriate number of pulses to the up or down counting input of the counter 24, in accordance with the magnitude and direction of the reset that is to occur.

In practice, the track jump logic circuit 50 is most preferably implemented in a suitably programmed microprocessor. More particularly, a number of the operations that are carried out in video tape recording machines are controlled by a central microprocessor. An example of a microprocessor-controlled video tape recording and reproducing machine is disclosed, for example, in U.S. Pat. No. 4,536,806. In the practice of the present invention, a microprocessor of the type disclosed in that patent can also be used to provide track jump information to the steering logic circuit 28.

Figure 5:
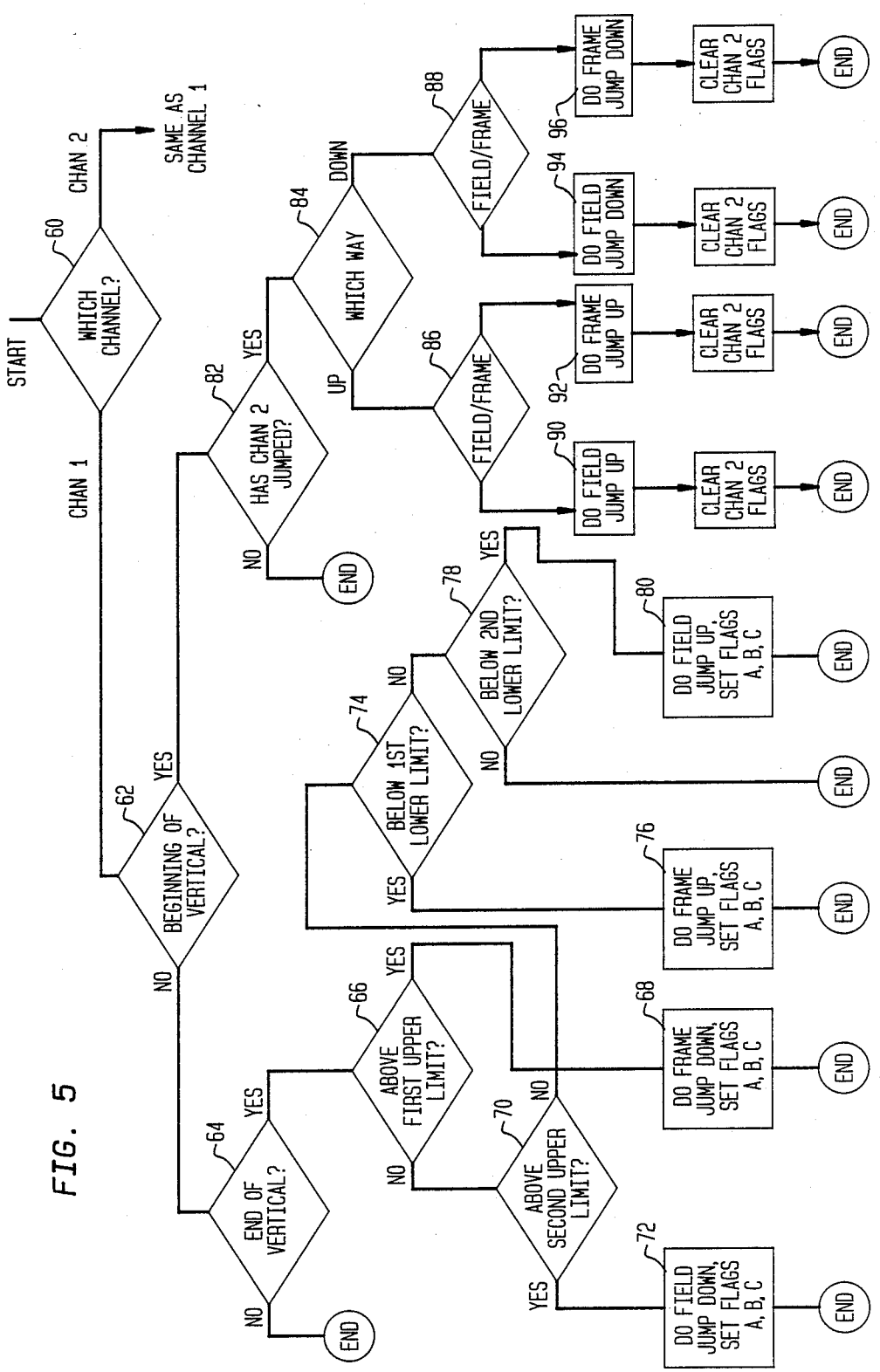
FIG. 5 is a flow chart depicting the operation of the track jump logic for controlling the repositioning of the heads.

A flow chart of a subroutine for controlling a microprocessor to perform the track jump operation is illustrated in FIG. 5. This subroutine might be entered by means of an interrupt to the microprocessor that is generated each time the scanning drum tachometer signal B changes state, for example, to indicate that one pair of heads has just gone off tape. The subroutine begins with a determination at step 60 of the heads which are presently on the tape. Such a determination can be made, for example, with reference to the scanner tachometer signal B shown in FIG. 3A. Once this determination has been made, the program then checks at step 62 whether the particular segment that is being reproduced relates to the beginning of a field. If not, the program checks at step 64 whether the segment pertains to the end of a field. If not, the program ends at that point. If, however, the heads are scanning a track that relates to the last segment in a field, the program determines at step 66 whether the elevation of the heads is above a first predetermined upper limit. Such a determination can be made, for example, with reference to the ramp value generated by the up/down counter 24. If the heads are positioned above this limit, the program instructs the channel 2 steering logic, at step 68, to carry out a frame jump in a downward direction. For example, this instruction can be the data loaded into the timer chips 52. In the specific example in which each field is divided into three segments and two heads simultaneously scan the tape, each field comprises 6 tracks on the tape. Thus a frame jump, which encompasses two fields, would cause the heads to be moved downwardly a distance related to the width of 12 tracks on the tape, plus or minus a correction factor related to tape speed.

When a jump is carried out, the program sets three flags labelled A, B, and C for channel 2. Flag A is set to a value of 1 to indicate that a jump has occurred. Flag B is set to a value of 0 or 1 in dependence upon the direction of the jump. For example, a downward jump might be indicated by setting the flag B to a value of 0. The flag C is set to a 0 or a 1 in dependence upon whether a field (6 track) or frame (12 track) jump has been carried out. In the present case, the flag C could be set to a value of 1 to indicate a frame jump.

Referring again to step 66, if the head elevation is not above the first upper limit, the program proceeds to step 70 in which it determines whether the heads are located above a second upper limit which is lower than the first upper limit. If the heads are located above this second limit, the program proceeds to step 72 and instructs the steering logic for channel 2 to perform a field jump in the downward direction. Again, the flags A, B and C are set, except that the value for flag C differs from the value to which it is set in step 68.

At step 70, if the program determines that the head elevation is not above the second upper limit, it then proceeds to step 74 to determine whether the heads are located below a first lower limit. If so, the steering logic is instructed at step 76 to do a frame jump in the upward direction. Again, the flags A, B and C are set as appropriate. If the heads are not below the first lower limit, a determination is made in step 78 whether they are below a second lower limit which is above the height of the first lower limit. If so, the steering logic is instructed at step 80 to do a field jump in the upward direction, and the flags A, B and C are appropriately set. If the heads are not below the second lower limit, i.e. they are situated between the second upper limit and the second lower limit, no jump is required and the routine ends.

Once one pair of heads has been reset during the last segment of one field, the other pair of heads must be reset at the beginning of the next field. Referring again to step 62, if a determination is made that the tracks being scanned relate to the beginning segment of a field, the program proceeds to step 82 to determine whether the heads for the other channel were previously reset. This determination is made by checking the status of the flag A. If no jump was previously carried out, the routine ends. If, however, a jump has occurred, the program examines flag B in step 84 to determine the direction of the jump. In response thereto, the program proceeds to step 86 or 88, as appropriate, to examine flag C and determine whether a field or frame jump was carried out. In response to the status of this flag, the steering logic 28 for the channel 1 heads are instructed to carry out the appropriate jump in one of the steps 90, 92, 94 or 96. Then, the flags for channel 2 are cleared and the routine ends.

From the foregoing, it can be seen that the present invention provides an approach for the automatic positioning of video heads which are used to reproduce information that is recorded in a segmented format. By controlling the elevational position of the off-tape head in accordance with that of the on-tape head, the need for quick resetting of the heads at the beginning and end of each segment is avoided. Further in this regard, resetting operations that are required by non-standard playback modes are coordinated with the on-tape and off-tape status of the heads to enable such resetting to be carried out at a reasonable rate that does not unduly stress the mechanical system which effects the head movement.

It will be appreciated by those of ordinary skill in the art that the present invention can be embodied in other forms without departing from the spirit or essential characteristics thereof. For example, although examples of the invention have been described with particular reference to video reproduction, i.e., playback, the principles of the invention are equally applicable to recording heads. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Apparatus for transferring video information signals to and from a tape on which the signals are recorded in a segmented format where information pertaining to each field of a video signal is divided among plural successive tracks disposed at an angle relative to the longitudinal direction of the tape, comprising:

at least two transducers each having an information transferring region and being at spaced locations from one another on a moveable support which causes each of said transducers to travel along a predetermined path;

means for transporting the tape along at least a portion of said predetermined path such that said transducers traverse said tape at said angle when said tape is being transported at a predetermined longitudinal velocity, said portion of said predetermined path being of sufficient length such that at least one of said transducers is in operatively relationship with the tape at any time to transfer information signals therebetween, while at least another said transducer is in non-operative relationship with said tape;

means for varying the location of the information transferring region of each of said transducers in a direction generally transverse to the direction of said predetermined path, to thereby position said regions relative to tracks of information recorded on tape;

first control means responsive to the longitudinal velocity of the tape for controlling said varying means to vary the location of the information transferring region of both of said transducers in the same manner;

means for determining the relationship of a particular segment on tape, to a video field, which segment is in operating relationship with one said transducer, and providing a first control signal when said segment is a last segment, and a second control signal when said segment is a first segment of a particular video field;

second control means for receiving said first control signal and in response thereto selectively providing a jump signal and applying said jump signal to said means for varying the location of said another transducer to be displaced a distance related to the spacing of adjacent tracks on the tape; and third control means for receiving said second control signal and for determining whether said one transducer has been displaced in response to a first control signal, and for providing responsively a jump signal having the same direction and magnitude as that applied to said means for varying the location of said one transducer, and applying said jump signal to said means for varying the location of said another transducer to be displaced the same distance as said one transducer.

2. The apparatus of claim 1 wherein said movable support includes a rotating drum and said transducers are located at positions on the circumference of said drum which are spaced 180° from one another.

3. The apparatus of claim 1 wherein each of said transducers comprises a pair of magnetic heads, one of said heads of each pair being oriented at an angle to said predetermined path in one direction and the other head of the pair being oriented at said angle to said path in the opposite direction.

4. The apparatus of claim 1 wherein said first control means includes means for generating ramp signals whose slopes are proportional to the speed and direction of movement of said tape, and means for applying said ramp signals to the varying means for both of said transducers simultaneously.

5. The apparatus of claim 4 wherein the slopes of said ramp signals are proportional to the ratio of actual speed of the tape and said predetermined velocity.

6. The apparatus of claim 4 wherein said second and third control means include means for generating track jump signals which cause said transducers to move in said transverse direction a distance related to the spacing of adjacent tracks on the tape, and means for summing said track jump signals with the ramp signals that are applied to the varying means of each of said transducers, respectively.

7. The apparatus of claim 1 wherein said second and third control means include means for generating track jump signals which cause said transducers to move in said transverse direction a distance related to the spacing of adjacent tracks on the tape, and means for applying said track jump signals to the varying means of each transducer, respectively.

8. In a video tape player of the type in which each field of video information is recorded on the tape in plural segments with each segment being located on a separate track of recorded information and in which the reproduction of recorded information is carried out by means of at least two transducers which alternately go into and out of contact with the tape, a method for controlling the elevational positions of the transducers in a direction generally transverse to the longitudinal direction of the tracks, comprising the steps of:

detecting when one of the transducers comes into contact with the tape and determining whether a last segment of information pertaining to a video field reproduced by that transducer;

examining the elevational position of the other transducer when said one transducer is reproducing said last segment of information and determining whether its elevational position is within a predetermined range:

changing the elevational position of said other transducer by a distance related to the spacing of adjacent tracks on the tape when its position is determined to be within said range;

subsequently detecting when said one transducer comes out of contact with the tape; and changing the elevational position of said one transducer by said distance when said other transducer is reproducing a first segment of information pertaining to a next video field.

9. The method of claim 8 further including the steps of:

determining the position of the transducer which is in contact with the tape relative to the track of information being reproduced;

varying the position of the transducer in contact with the tape to maintain it in proper alignment with the track of information being reproduced; and varying the elevational position of the other transducer, which is out of contact with the tape, so that it occupies the same elevational position as the transducer which is in contact with the tape.

* * * * *